(12) United States Patent
Konuru et al.

(10) Patent No.: US 9,613,411 B2
(45) Date of Patent: Apr. 4, 2017

(54) CREATING DEFECT CLASSIFIERS AND NUISANCE FILTERS

(71) Applicant: KLA-Tencor Corporation, Milpitas, CA (US)

(72) Inventors: Raghavan Konuru, Andhra Pradesh (IN); Naema Bhatti, San Jose, CA (US); Michael Lennek, San Jose, CA (US); Martin Plihal, Pleasanton, CA (US)

(73) Assignee: KLA-Tencor Corp., Milpitas, CA (US)

( * ) Notice: Subject to any disclaimer, the term of this patent is extended or adjusted under 35 U.S.C. 154(b) by 120 days.

(21) Appl. No.: 14/505,446

(22) Filed: Oct. 2, 2014

(65) Prior Publication Data

US 2015/0262038 A1    Sep. 17, 2015

Related U.S. Application Data

(60) Provisional application No. 61/954,339, filed on Mar. 17, 2014.

(51) Int. Cl.
*G06T 7/00* (2006.01)
*G06K 9/62* (2006.01)

(52) U.S. Cl.
CPC .......... *G06T 7/0004* (2013.01); *G06K 9/6254* (2013.01); *G06K 9/6282* (2013.01); *G06K 2209/19* (2013.01)

(58) Field of Classification Search
None
See application file for complete search history.

(56) References Cited

U.S. PATENT DOCUMENTS

| | | | |
|---|---|---|---|
| 6,430,572 B1 * | 8/2002 | Steffan | G06F 17/30289 |
| 7,283,659 B1 * | 10/2007 | Bakker | G06K 9/6254 |
| | | | 382/144 |
| 7,359,544 B2 | 4/2008 | Gao et al. | |
| 8,000,519 B1 * | 8/2011 | Zheng | H01L 22/12 |
| | | | 324/500 |
| 8,126,255 B2 | 2/2012 | Bhaskar et al. | |
| 8,265,355 B2 * | 9/2012 | Zhao | G06K 9/6255 |
| | | | 382/128 |
| 8,934,722 B2 * | 1/2015 | Peleg | G06K 9/6254 |
| | | | 382/224 |
| 9,134,805 B2 * | 9/2015 | Ferren | G02B 13/0065 |
| 2006/0085417 A1 * | 4/2006 | John | G06F 17/30604 |
| 2006/0245634 A1 | 11/2006 | Soenksen et al. | |
| 2007/0106416 A1 * | 5/2007 | Griffiths | B23K 26/032 |
| | | | 700/166 |
| 2008/0147355 A1 | 6/2008 | Fields et al. | |

(Continued)

OTHER PUBLICATIONS

International Search Report for PCT/US2015/020790 mailed Jul. 24, 2015.

*Primary Examiner* — Michelle Hausmann
(74) *Attorney, Agent, or Firm* — Ann Marie Mewherter (57) ABSTRACT

Methods and systems for setting up a classifier for defects detected on a wafer are provided. One method includes generating a template for a defect classifier for defects detected on a wafer and applying the template to a training data set. The training data set includes information for defects detected on the wafer or another wafer. The method also includes determining one or more parameters for the defect classifier based on results of the applying step.

41 Claims, 3 Drawing Sheets

(56) References Cited

U.S. PATENT DOCUMENTS

| | | | |
|---|---|---|---|
| 2011/0007961 A1* | 1/2011 | Iwanaga | G01N 21/8851 382/149 |
| 2012/0128233 A1 | 5/2012 | Nakagaki et al. | |
| 2013/0070986 A1* | 3/2013 | Peleg | G06K 9/6254 382/128 |
| 2013/0279794 A1 | 10/2013 | Greenberg et al. | |
| 2013/0294680 A1* | 11/2013 | Harada | H01L 22/20 382/149 |
| 2014/0133737 A1* | 5/2014 | Plihal | G06T 7/0008 382/149 |
| 2014/0140629 A1* | 5/2014 | Tai | G06T 7/0012 382/218 |
| 2014/0193065 A1* | 7/2014 | Chu | G06T 7/0004 382/149 |
| 2014/0207271 A1* | 7/2014 | Tsai | G05B 23/024 700/121 |
| 2014/0241610 A1 | 8/2014 | Duffy et al. | |
| 2014/0355867 A1* | 12/2014 | Lin | G06T 7/001 382/149 |

* cited by examiner

CREATING DEFECT CLASSIFIERS AND NUISANCE FILTERS

BACKGROUND OF THE INVENTION

1. Field of the Invention

The present invention generally relates to methods and systems for creating defect classifiers and nuisance filters.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers. Inspection processes have always been an important part of fabricating semiconductor devices such as integrated circuits. However, as the dimensions of semiconductor devices decrease, inspection processes become even more important to the successful manufacture of acceptable semiconductor devices. For instance, as the dimensions of semiconductor devices decrease, detection of defects of decreasing size has become necessary since even relatively small defects may cause unwanted aberrations in the semiconductor devices.

Automatic defect classification (ADC) of semiconductor defects is an important application of wafer inspection and defect review tools. The most popular and most trusted defect classifiers and nuisance filters used during wafer inspection are manually created decision trees. By far, the most common method for creating defect classification trees is a manual approach with several ease-of-use features such as the ability to copy and paste sub-trees, etc. The success of these methods depends not only on the experience and patience of the engineer, but also on the time available for this task. It is quite clear that this approach is and always will be subjective, error-prone, and subject to the limited capabilities of humans to explore relatively large spaces of defect properties at each important classifier node.

Some alternative approaches to classifier creation not widely adopted today involve some degree of automation. Generally, these methods require classified defects with designations of nuisance, real, and defects of interest (DOI). The goal of these methods may be to produce tuned classifiers, or multiple classifier candidates, as a starting point for manual tuning and adjustments.

The currently used methods described above have a number of important disadvantages. For example, the disadvantages of the manual approach are its: (a) subjectivity; (b) reliance on the skills and experience of human experts; (c) dependence on the amount of time available for the classifier creation (which can vary widely); and (d) propensity to human-induced errors (through repetition and mental exhaustion).

A disadvantage of the "automated" approaches is that they construct and tune classifiers in one step by trying to identify the best discrimination criteria between defect types (manually classified defects) at each node of the classifier. In addition, they ignore the well-established practice of two-step classifier creation: (1) first, create a decision tree that separates defects into stable populations (by region, polarity, and other segmentation attributes); and (2) tune these populations independently of each other. Furthermore, some algorithms used in such methods may be completely unconstrained. They may create classifiers that do not adhere to the principle of separation and tuning in two steps. Modification of the decision trees created by these methods is cumbersome. Other algorithms used in these methods have more flexibility if they can be run from any leaf node of a sub-tree. As such, they may be applied to the separated populations for the final step of classifier tuning. However, this mode of operation still requires people to do the entire initial classifier creation manually including the search for separable populations. The algorithm only helps with the tuning part of decision tree creation.

The reality is that classifiers are constructed on training data sets first without knowing the defect types with a high degree of certainty. As mentioned above, the guiding principle is to construct a classifier that separates defects into stable populations (segmentation by clustering, etc.), then sample defects from the leaf nodes to allow tuning, and finally tune the leaf nodes based on the defect types.

Accordingly, it would be advantageous to develop systems and methods for setting up defect classifiers for wafer inspection that address the shortcomings of the methods described above.

SUMMARY OF THE INVENTION

The following description of various embodiments is not to be construed in any way as limiting the subject matter of the appended claims.

One embodiment relates to a method for setting up a classifier for defects detected on a wafer. The method includes generating a template for a defect classifier for defects detected on a wafer. The method also includes applying the template to a training data set. The training data set includes information for defects detected on the wafer or another wafer. In addition, the method includes determining one or more parameters for the defect classifier based on results of the applying step. The generating, applying, and determining steps are performed with a computer system.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for setting up a classifier for defects detected on a wafer. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to set up a classifier for defects detected on a wafer. The system includes a computer system configured for performing the generating, applying, and determining steps described above. This system may be further configured as described further herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

The embodiments described herein generally relate to new methods and systems for creating defect classifiers and nuisance filters. For example, one embodiment relates to a method for setting up a classifier for defects detected on a wafer. The embodiments described herein propose new methods and systems for designing and constructing decision tree classifiers that facilitate and improve this process.

As will be described further herein, the embodiments provide a number of significant improvements over existing methods. For example, the embodiments can be used to create an initial decision tree based on defect separability criteria. In addition, the embodiments described herein can be used to automate all fully-mechanical steps in the classifier creation and thus can be used to speed up the process. The embodiments described herein also provide a framework for systematic data analysis at each tree node where non-trivial decisions must be made. Furthermore, the embodiments described herein provide a framework that enables variable degrees of automation in the classifier design, from fully manual with only mechanical steps automated, to fully automated where the entire tree is created with one click. In addition, the embodiments described herein provide a template that allows standardization of classifiers (possibly according to user specifications), reduces user errors, and allows recipe validation against such templates. In this manner, the embodiments described herein provide the potential to speed up, improve, and standardize classification tree creation.

The method includes generating a template for a defect classifier for defects detected on a wafer. In one embodiment, the template is a level-based template, and the defect classifier is a level-based defect classifier. In some embodiments, the template includes information for one or more nodes of the defect classifier. For example, the embodiments described herein provide a framework for level-based decision tree definition and for classifier creation. The level-based decision tree may include one or more nodes into which defects will be separated by the defect classifier, and the information for the one or more nodes included in the template may include one or more parameters for one or more of those nodes. The embodiments described herein can, however, use different kinds of templates that are not necessarily only level-based, but also allow definition of different behaviors on different sides of the classifier, e.g., one could specify a tree by simply choosing a set of attributes and assigning them a meta-type (e.g., iteration, cutline, separation) and then letting the template construct a tree by ordering these "meta" types in the "best" manner.

In another embodiment, generating the template includes receiving parameters for the template from a user via a user interface provided by a computer system described herein. In this manner, the embodiments described herein may provide a user interface for setting up a level-based classifier. The user interface can be used to set up and manage the instruction set (referred to herein as a "template") for creating classifiers on a given training data set. Examples of instructions for levels include insert a node (e.g., feature=Region ID) and create a child node for each Region ID found in the training data. Another example includes insert a node (e.g., feature=polarity) and use a fixed cut line of 0.5, i.e., one child node for bright defects and one child for dark and mixed defects. An additional example includes insert a node with a feature (1D) or pair of features (2D) that best separates defects into stable sub-populations at each node of the level and create a child for each of the separated populations (a list of features to be searched may be supplied by a user). A further example includes insert tunable nodes without specific cut line positions (those may be determined during classifier tuning), etc. The level-based instructions can generate unbalanced trees whenever less separability exists on one side of the tree.

Figure 1:
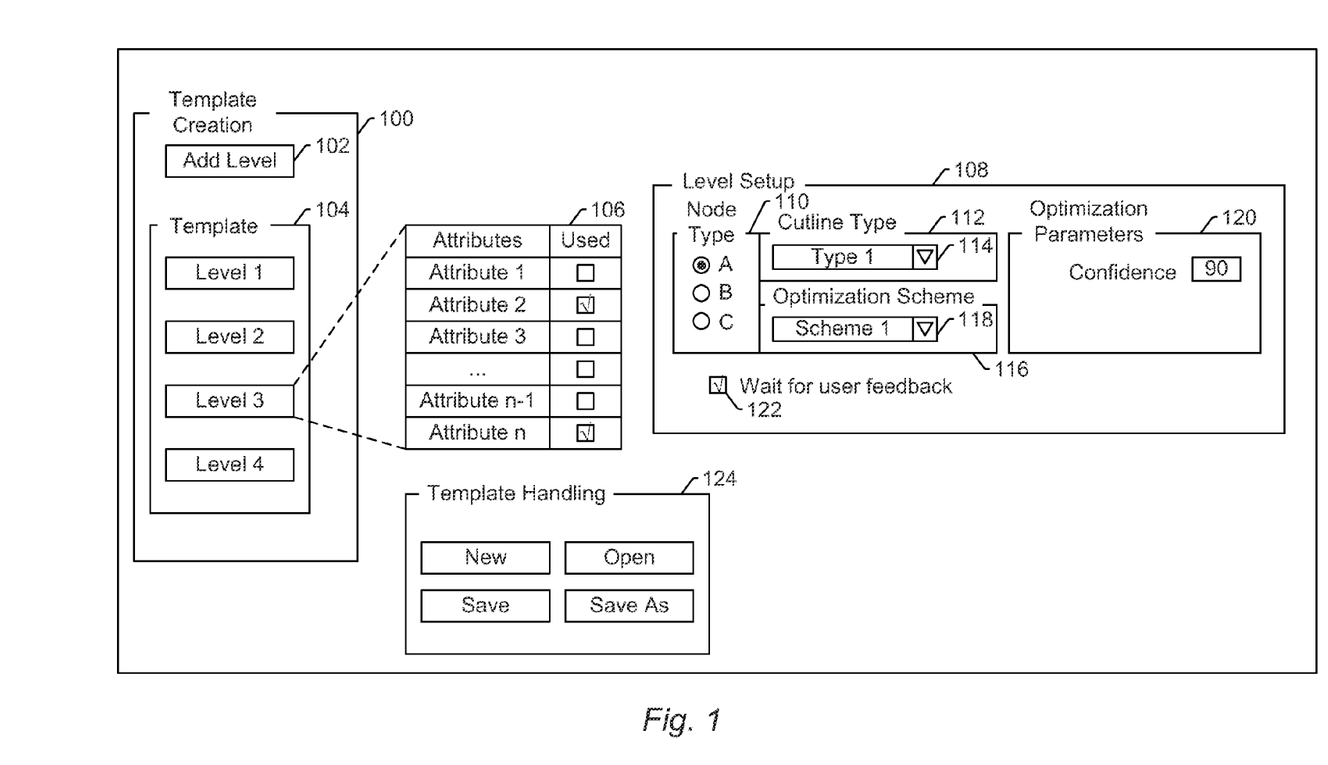
FIGS. 1 and 2 are schematic diagrams illustrating various portions of a user interface that can be used to perform one or more steps of one or more embodiments described herein.

FIG. 1 illustrates one embodiment of a user interface for level-based classifier template setup. As shown in this figure, the user interface may include Template Creation section 100. In this section, the user interface may include Add Level option 102. By selecting the Add Level option, an additional level may be shown in Template section 104. For example, if the templates previously included Levels 1, 2, and 3 shown in FIG. 1, upon selection of the Add Level option. Level 4 may be displayed in the Template section. In this manner, the user may use the user interface shown in FIG. 1 to add levels to the template.

The user can also select different levels at different times such that various parameters can be set for the levels. In this manner, the user may configure each level of the template using the user interface shown in FIG. 1. For example, if a user selects Level 3 in FIG. 1, the user interface may display various options that can be used for Level 3 in the template. In one such example, the user interface may display list 106 of attributes that the user can select for use in the level by checking or unchecking the box next to the name of each of the attributes. The attributes that are displayed in the list for any one level may include any and/or all of the attributes that can be determined for the defects by the inspection system that will be generating the wafer inspection results to which the classifier will be applied. Some examples of such attributes include, but are not limited to, energy parameter, magnitude, polarity, reference roughness, reference brightness, test roughness, test brightness, threshold, etc. The attributes may also include defect detection-specific parameters (i.e., parameters for the defects that are specific to the defect detection algorithm used to detect them). For example, the multi-die auto-thresholding (MDAT) algorithm that is used by some commercially available inspection systems from KLA-Tencor, Milpitas, Calif. may determine defect attributes such as MDAT gray level and MDAT offset. Such attributes may also be available for selection for any or all of the levels.

The user interface may also include Level Setup section 108 in which various options may be displayed for selection by the user or to allow the user to provide input for various options. Therefore, this section can be used to display, alter, and input the instruction set for the selected level. In this manner, the Level Setup section can be used to setup the parameters of the template for the different levels.

For example, as shown in FIG. 1, the Level Setup section may include Node Type section 110 in which various options for the nodes that may be included in the level may be displayed. A user can then select a type of the node by clicking on the button next to the name of each node type. For example, as shown in FIG. 1, a user may have selected Node Type A and not Node Types B and C. The node types that are shown in the Node Type section may include any and all of the node types that are available for use in the classifier. Examples of suitable node types include, but are not limited to, 1D, 2D, and best (i.e., to be determined by the method).

The Level Setup section may also include Cutline Type section 112 in which a user can select a type of cutline from drop down menu 114. The cutline types shown in the drop down menu may include any and all of the cutline types that may be used for the nodes in the level, one example of which may be an optimization cutline type. The Level Setup section may further include Optimization Scheme section 116 in which a user can select a type of optimization scheme from drop down menu 118. The optimization schemes shown in the drop down menu may include any and all of the optimization schemes that may be used for the nodes in the level, one example of which may be a separability optimization scheme.

In addition, the Level Setup section may include Optimization Parameters section 120, which may include an option for the user to select a confidence level for the selected level. For example, in the embodiment shown in FIG. 1, the user may have input a confidence level of 90 for level 3. The Level Setup section may also include box 122 that a user can check or uncheck depending on whether the determining step described herein is to wait for user feedback. The Level Setup section shown in FIG. 1 may also be altered to include more options than those shown in FIG. 1 or fewer options than those shown in FIG. 1 depending on the manner in which the classifier will be setup.

The user interface may further include Template Handling section 124 that can display the various options for a user to load or save the classifier definition as a template that can be shared. For example, as shown in FIG. 1, the Template Handling section may include New, Open, Save, and Save As options.

The embodiments described herein may also be configured to allow the user to specify some criteria for "nuisanceness" (e.g., low energy+low magnitude, membership in a "small" cluster in separation variables+high Max Dim) and then create a defect classifier as described further herein by finding the MAX set of defects that satisfy these criteria. As such, the user may input potentially relevant manners of separating out nuisance defects.

In a further embodiment, the template includes information about user input to be received during one or more steps of the method. For example, the template may include instructions about the level of user interactivity during the classifier creation, i.e., whether user feedback will be requested at any construction setup step.

As described above, therefore, a template may be generated based on input from a user (e.g., by translating the input received from a user into a set of instructions that can be used to perform other steps described herein). Any of the templates described herein can be stored in any suitable format such that the stored template can be used as described further herein to determine a final version of a defect classifier.

The method also includes applying the template to a training data set, which includes information for defects detected on the wafer or another wafer. The training data set may include any suitable defect information. For example, the training data set may include all of the information generated for all of the defects detected on the wafer or another wafer by an inspection system that performed an inspection of the wafer or the other wafer. In addition, the training data set may include any other information generated for the defects by any other tool (e.g., a defect review tool and/or a metrology tool).

In one embodiment, applying the template includes separating defects in the training data set into stable populations. For example, "clustering" algorithms for finding stable, separable defect populations may be used in the embodiments described herein. In particular, the clustering algorithms may be configured to identify different clusters of values for one or more attributes of the defects in the training data set that are separated in the values from other clusters of the values. In this manner, the clustering algorithms may identify subpopulations of defects having similar values of one or more defect attributes that are significantly different from the values of the one or more defect attributes of other subpopulations of the defects. However, other algorithms such as sampling or tuning algorithms are envisioned to become part of the analytics framework described further herein in the future.

In another embodiment, applying the template includes generating an initial version of the defect classifier. For example, an initial version of the defect classifier may be generated by the applying step based, for example, on the stable, separable defect populations described above. That initial version of the defect classifier may then be altered as described further herein to determine the final version of the defect classifier.

The method further includes determining one or more parameters for the defect classifier based on results of applying the template. In this manner, the embodiments described herein can be used as a classification tree translation or creator. In other words, the applying and determining steps may essentially function as a classifier creation sequencer that translates the level-based template (instruction set) created as described above into the classification tree. The sequencer may control the construction of the classification tree on the training data set by invoking commands performed manually by humans and by invoking the algorithms described above. In this manner, when training data is loaded into the embodiments described herein, a decision tree classifier can be created out of a level-based template (or a level-based instruction set). As such, the decision tree translator or creator processes the template to create the classifier on the training data set.

In one embodiment, determining the one or more parameters includes tuning one or more parameters of the initial version of the defect classifier by sampling one or more defects from different nodes in the initial version of the defect classifier resulting from the applying step and determining a classification of the one or more sampled defects. The one or more defects may be sampled from the different nodes in any suitable manner. In addition, the classification of the sampled defect(s) may be determined in any suitable manner. Sampling the defects and determining the classification of the defects can be used to determine if the initial version of the defect classifier is performing as desired. In other words, the defect classifications can be used to determine if the defect classifier is classifying the defects correctly. If it is determined that the defect classifier is not classifying the defects correctly, then one or more parameters of the initial version of the defect classifier can be altered to correct those errors. For example, a cutline may be altered so that defects are moved from one node to another node and thereby from one defect classification to the correct defect classification. In this manner, the embodiments described herein provide extendability to classifier tuning. For example, the algorithms described herein can be used for analyzing any node of any decision tree or defect classifier outside of the automated defect classifier creation process.

In another embodiment, the applying and determining steps are performed by executing one or more algorithms from nodes of the initial version of the defect classifier. For example, search, clustering, and segmentation algorithms can be introduced into individual nodes of the classification trees and these algorithms can be used in the classifier creation. In this manner, the embodiments described herein provide an analytics framework for executing plug-in algorithms directly from the classification tree nodes. The framework may be implemented with well-defined communication standards for executing algorithms directly from tree nodes. In some embodiments, the method includes displaying results of the applying step in a user interface and receiving a user selection for one or more nodes in the results for analysis via the user interface, and the determining step includes executing one or more algorithms from the one or more selected nodes to analyze the one or more selected nodes.

Figure 2:
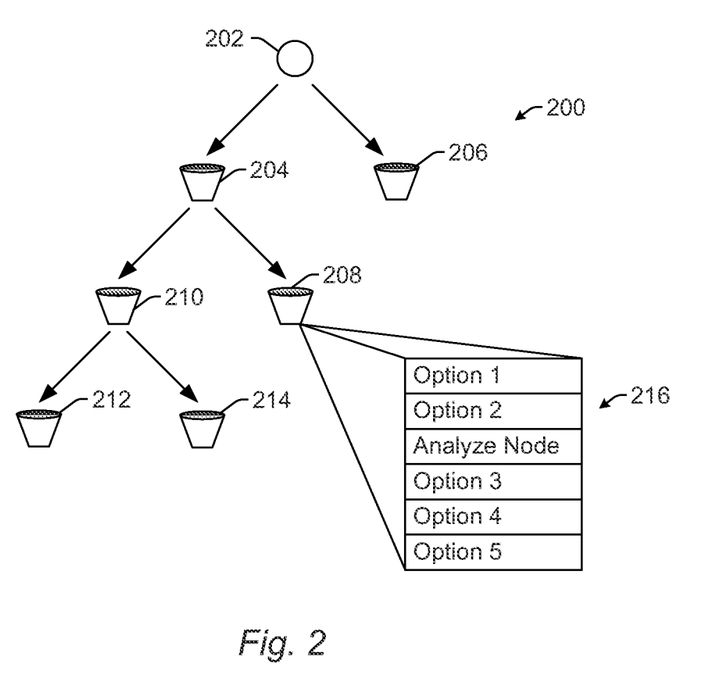

FIG. 2 illustrates a portion of the information that may be displayed to a user in a user interface by the embodiments described herein. For example, as shown in FIG. 2, the user interface may display initial version 200 of the defect classifier. The version of the defect classifier may also be an intermediate version of the defect classifier. In other words, the applying and determining steps may generate a number of different versions of the defect classifier before a final version is determined.

As further shown in FIG. 2, the defect classifier is configured as a multi-level decision tree in which population 202 of defects is split into two nodes 204 and 206, the defects binned into node 204 are separated into two nodes 208 and 210, and the defects binned into node 210 are separated into nodes 212 and 214. It is to be understood that the version of the defect classifier shown in FIG. 2 is just one example of a decision tree classifier that can be generated by the embodiments described herein. Obviously, the actual characteristics of any version of a defect classifier generated by the embodiments described herein will vary depending on the template used in the embodiments and the defect training set.

The decision tree may be configured to separate the defects into the different nodes based on different attributes of the defects that may be determined based on the template and the applying and determining steps. Examples of defect attributes that may be used in the defect classifiers described herein include Region ID (e.g., memory region such as SRAM, a region containing multiple types of features (a "multi" region), other, etc.), polarity (e.g., bright, mixed, dark, etc.), reference roughness, and any of the other defect attributes described herein. The order in which the defects are separated into the different nodes may also vary depending on the template and the applying and determining steps. For example, the defects may first be separated based on Region ID, then polarity, and finally reference roughness, but any other suitable order may be used.

The user interface that displays the version of the defect classifier may provide an analytics framework for executing plug-in algorithms from any of the tree nodes. In particular, the user may click on a Tools menu (not shown in FIG. 2) provided by the user interface to configure features and parameters for analysis globally or from inside the template definition. In addition, the user interface may allow the user to perform analysis of the defect classifier version shown in the user interface. For example, the user may click on a node shown in the defect classifier and execute analysis from the user interface. In one such example, if a user clicks on node 208, menu 216 may be displayed in the user interface. The menu may display a number of options (e.g., shown generically in the figure as Options 1-5) as well as an Analyze Node option.

In one such embodiment, the determining step also includes displaying results of executing the one or more algorithms to the user via the user interface and allowing the user to select at least some of the one or more parameters for the defect classifier. For example, if the Analyze Node option is selected by the user, the results produced by the embodiments for the selected node may be displayed. The results that are displayed may include any results generated for the node. For example, if the node is a 1D node, the results that are displayed may include a number of plots or histograms, possibly with various parameters determined for the displayed version of the defect classifier such as cutlines. Similar results may be shown in the user interface if the node is a 2D node. In this manner, the user interface may graphically display possible results and/or possible solutions for the selected node, and an Accept option may be displayed next to each of the results and/or solutions so that a user can select which option to use with the selected node.

In one embodiment, the determining step includes interrupting the determining to request input from a user for a node of an intermediate version of the defect classifier and upon receipt of the input from the user, resuming the determining step for other nodes in the defect classifier. For example, the sequencer may have the ability to pause for user feedback or input at specified points of execution before proceeding. In one such example, during the decision tree creation, user feedback may be optionally requested in one of the nodes, and then the creation may continue to the next node. In some such embodiments, the input is requested from the user by displaying a sorted list of suggestions for the node from which the user can select the one or more parameters for the node. In this manner, when requesting feedback for a node from a user, a user interface such as the user interfaces described herein may display a sorted list of suggested features to select from (or feature pairs in the case of 2D nodes). For example, the user interface may display results such as those described above in a descending order from most highly recommended at the top of the user interface to least recommended at the bottom of the user interface. The user interface may also display an accept button next to each of the displayed results that can be clicked on by a user to make their selection. A user can therefore accept a candidate and/or modify cutline positions before proceeding.

In another embodiment, the applying and determining steps include searching all values of all attributes of the defects in the training set data for one or more best segmentation candidates for one or more nodes of the defect classifier. For example, the embodiments described herein make it possible to construct classifiers and nuisance filters with higher speed, efficiency, and consistency than existing methods. In particular, speed is achieved through automation of mechanical repetitive steps. Efficiency and consistency are achieved through execution of "clustering" algorithms that search the attribute space for the best segmentation candidates at each specified node. These algorithms make it possible to search exhaustively the space of attributes irrespective of the time available for recipe setup. In addition, the proposed framework lends itself to automation as well as fully manual operation with the benefit of having machine-generated candidate solutions available in sorted form. This itself will significantly speed up today's effort and guarantee that all possible candidates have been considered (especially for 2D nodes) even when the algorithm results are imperfect. Furthermore, one of the main advantages of the embodiments described herein is the identification of 2D nodes which a user might not be able to identify due to lack of visualization (e.g., humans typically can only "see" ID histograms) and most of the time a user does not have time to go through all possible 2D combinations and choose the best options. Not being able to select the best options negatively impacts sensitivity. Therefore, the embodiments described herein will be able to produce more sensitive defect classifiers.

In some embodiments, the method includes determining different defect classifiers for different wafer inspection recipes using the template. For example, the proposed level-based template for classifier creation represents a new meta-data representation of classification trees that imposes uniformity and reduces human errors. One such template can be used to create different classification trees for different inspection recipes. Therefore, one template could be used for a set of inspection recipes. In this manner, the embodiments described herein provide standardized classifier creation through the use of level-based templates, which is believed to be new.

In an additional embodiment, the applying and determining steps produce defect classification results for the training data set, and the method includes determining information for a wafer inspection recipe for the wafer, the other wafer, or an additional wafer based on the defect classification results. In one such embodiment, the information for the wafer inspection recipe includes a determination of whether the wafer inspection recipe is valid. In another such embodiment, the information for the wafer inspection recipe includes information for one or more differences between the wafer inspection recipe and another wafer inspection recipe. For example, the templates described herein can be used for recipe validation and recipe comparison. In an additional embodiment, the information for the wafer inspection recipe includes information for whether one or more nuisance filters in the wafer inspection recipe adhere to the template. For example, the validation may include whether nuisance filters in the recipe adhere to the template.

In a further embodiment, applying the template to the training data set automatically creates an initial version of the defect classifier, the training data set does not include classifications for defects in the training data set, and determining the one or more parameters includes tuning one or more parameters of the initial version of the defect classifier to determine the one or more parameters for the defect classifier. For example, the embodiments described herein can be used for automating the initial classifier tree creation (not classifier tuning) using un-classified training data sets, which is believed to be a new, previously unavailable capability.

The generating, applying, and determining steps described herein are performed with a computer system, which may be configured as described further herein. In some embodiments, the generating, applying, and determining steps are performed automatically by the computer system. For example, a user interface such as that described herein may include a Create Tree button that when clicked on by a user will perform the decision tree translation/creation. In a fully automated mode, after the user requests that the decision tree creation begin, the best candidate solution may be selected by the embodiments described herein without pausing for user input. In another embodiment, at least one of the generating, applying, and determining steps is performed manually by a user of the computer system.

In this manner, the previously existing methods described above (manual and automated) are in some sense complimentary to the embodiments described herein as both manual and automated can be an inherent part of the classifier design process in the embodiments described herein. The differences are in the way these methods are integrated together and how automation is executed. In particular, the embodiments described herein provide a new framework for guided tree creation that combines automation of mechanical steps, node-based analytics (data mining and sorting), and human decision making.

The analytics frameworks described herein with their communication standards will make future algorithm development easier both for manual and automated modes of operation (e.g., separation of populations based on patch similarities, etc.). In addition, the embodiments described herein can receive user input in a variety of different ways (e.g., user input for parameters of the template, user input during the defect classifier creation, etc.). Therefore, the embodiments described herein can leverage user experience and/or expectation in the (semi-)automated creation of defect classifiers. In this manner, the embodiments described herein provide additional value in that a user can guide the creation of the defect classifier in the sense that they can specify the structure of the defect classifier to a great extent.

The embodiments of the method described above may be performed by any of the system embodiments described herein. In addition, the embodiments of the methods described above may include performing any step(s) and/or function(s) of any other embodiment(s) described herein.

The method may also include storing results of any of the step(s) of the method in a computer-readable storage medium. The results may include any of the results described herein and may be stored in any manner known in the art. The storage medium may include any suitable storage medium known in the art. After the results have been stored, the results can be accessed in the storage medium and used as described herein, formatted for display to a user, used by another software module, method, or system, etc.

Figure 3:
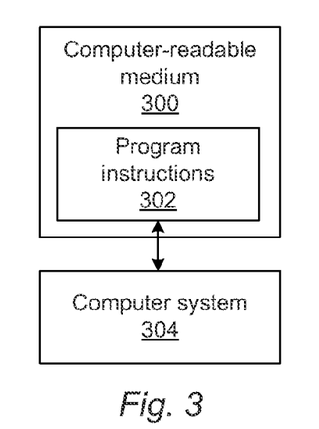
FIG. 3 is a block diagram illustrating one embodiment of a non-transitory computer-readable medium storing program instructions for causing a computer system to perform a computer-implemented method described herein.

Another embodiment relates to a non-transitory computer-readable medium storing program instructions executable on a computer system for performing a method (i.e., a computer-implemented method) for setting up a classifier for defects detected on a wafer. One such embodiment is shown in FIG. 3. For example, as shown in FIG. 3, computer-readable medium 300 stores program instructions 302 executable on computer system 304 for performing the method described above. The computer-implemented method for which the program instructions are executable may include any other step(s) of any other method(s) described herein.

Program instructions 302 implementing methods such as those described herein may be stored on computer-readable medium 300. The computer-readable medium may be a storage medium such as a magnetic or optical disk, or a magnetic tape or any other suitable non-transitory computer-readable medium known in the art.

The program instructions may be implemented in any of various ways, including procedure-based techniques, component-based techniques, and/or object-oriented techniques, among others. For example, the program instructions may be implemented using Matlab. Visual Basic, ActiveX controls. C, C++objects, C#, JavaBeans. Microsoft Foundation Classes ("MFC"), or other technologies or methodologies, as desired.

Computer system 304 may take various forms, including a personal computer system, mainframe computer system, workstation, system computer, image computer, programmable image computer, parallel processor, or any other device known in the art. In general, the term "computer system" may be broadly defined to encompass any device having one or more processors, which executes instructions from a memory medium.

Figure 4:
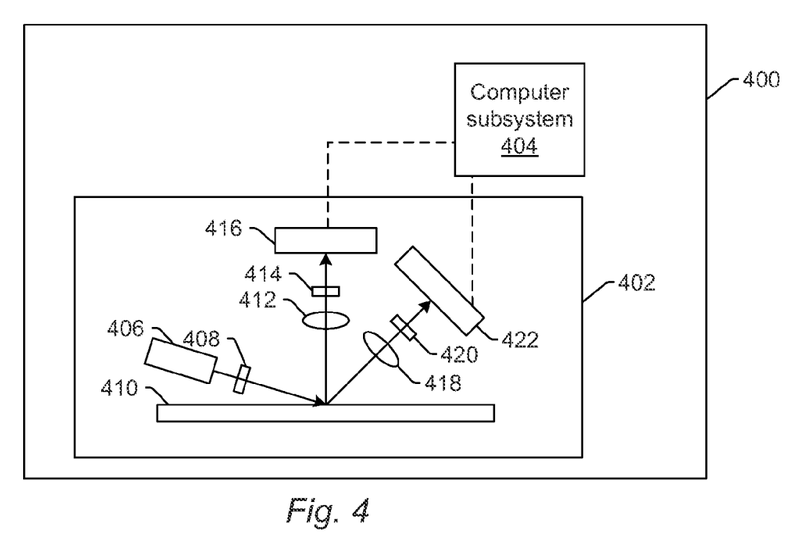
FIG. 4 is a schematic diagram illustrating a side view of an embodiment of a system configured to set up a classifier for defects detected on a wafer.

An additional embodiment relates to a system configured to set up a classifier for defects detected on a wafer. One embodiment of such a system is shown in FIG. 4. As shown in FIG. 4, system 400 includes computer subsystem 404 (or a "computer system"). The computer subsystem is configured to perform the generating, applying, and determining steps described further herein. In addition, the computer subsystem may be configured to perform any other step(s) described herein.

In some instances, the system may include an optical subsystem that is configured to generate output that can be used to detect defects on the wafer. For instance, as shown in FIG. 4, the system may include optical subsystem 402. The optical subsystem is configured to scan a wafer with light thereby generating output for the wafer. For example, as shown in FIG. 4, the optical subsystem includes light source 406 such as a laser. Light source 406 is configured to direct light to polarizing component 408. In addition, the optical subsystem may include more than one polarizing component (not shown), each of which may be positioned independently in the path of the light from the light source. Each of the polarizing components may be configured to alter the polarization of the light from the light source in a different manner. The optical subsystem may be configured to move the polarizing components into and out of the path of the light from the light source in any suitable manner depending on which polarization setting is selected for illumination of the wafer during a scan. The polarization setting used for the illumination of the wafer during a scan may include p-polarized (P), s-polarized (S), or circularly polarized (C).

Light exiting polarizing component 408 is directed to wafer 410 at an oblique angle of incidence, which may include any suitable oblique angle of incidence. The optical subsystem may also include one or more optical components (not shown) that are configured to direct light from light source 406 to polarizing component 408 or from polarizing component 408 to wafer 410. The optical components may include any suitable optical components known in the art such as, but not limited to, a reflective optical component. In addition, the light source, the polarizing component, and/or the one or more optical components may be configured to direct the light to the wafer at one or more angles of incidence (e.g., an oblique angle of incidence and/or a substantially normal angle of incidence). The optical subsystem may be configured to perform the scanning by scanning the light over the wafer in any suitable manner.

Light scattered from wafer 410 may be collected and detected by multiple channels of the optical subsystem during scanning. For example, light scattered from wafer 410 at angles relatively close to normal may be collected by lens 412. Lens 412 may include a refractive optical element as shown in FIG. 4. In addition, lens 412 may include one or more refractive optical elements and/or one or more reflective optical elements. Light collected by lens 412 may be directed to polarizing component 414, which may include any suitable polarizing component known in the art. In addition, the optical subsystem may include more than one polarizing component (not shown), each of which may be positioned independently in the path of the light collected by the lens. Each of the polarizing components may be configured to alter the polarization of the light collected by the lens in a different manner. The optical subsystem may be configured to move the polarizing components into and out of the path of the light collected by the lens in any suitable manner depending on which polarization setting is selected for detection of the light collected by lens 412 during scanning. The polarization setting used for the detection of the light collected by lens 412 during scanning may include any of the polarization settings described herein (e.g., P, S, and unpolarized (N)).

Light exiting polarizing component 414 is directed to detector 416. Detector 416 may include any suitable detector known in the art such as a charge coupled device (CCD) or another type of imaging detector. Detector 416 is configured to generate output such as an image that is responsive to the scattered light collected by lens 412 and transmitted by polarizing component 414 if positioned in the path of the collected scattered light. Therefore, lens 412, polarizing component 414 if positioned in the path of the light collected by lens 412, and detector 416 form one channel of the optical subsystem. This channel of the optical subsystem may include any other suitable optical components (not shown) known in the art such as a Fourier filtering component.

Light scattered from wafer 410 at different angles may be collected by lens 418. Lens 418 may be configured as described above. Light collected by lens 418 may be directed to polarizing component 420, which may include any suitable polarizing component known in the art. In addition, the optical subsystem may include more than one polarizing component (not shown), each of which may be positioned independently in the path of the light collected by the lens. Each of the polarizing components may be configured to alter the polarization of the light collected by the lens in a different manner. The optical subsystem may be configured to move the polarizing components into and out of the path of the light collected by the lens in any suitable manner depending on which polarization setting is selected for detection of the light collected by lens 418 during scanning. The polarization setting used for detection of the light collected by lens 418 during scanning may include P, S, or N.

Light exiting polarizing component 420 is directed to detector 422, which may be configured as described above. Detector 422 is also configured to generate output such as an image that is responsive to the collected scattered light that passes through polarizing component 420 if positioned in the path of the scattered light. Therefore, lens 418, polarizing component 420 if positioned in the path of the light collected by lens 418, and detector 422 may form another channel of the optical subsystem. This channel may also include any other optical components (not shown) described above. In some embodiments, lens 418 may be configured to collect light scattered from the wafer at polar angles from about 20 degrees to about 70 degrees. In addition, lens 418 may be configured as a reflective optical component (not shown) that is configured to collect light scattered from the wafer at azimuthal angles of about 360 degrees.

The optical subsystem shown in FIG. 4 may also include one or more other channels (not shown). For example, the optical subsystem may include an additional channel, which may include any of the optical components described herein such as a lens, one or more polarizing components, and a detector, configured as a side channel. The lens, the one or more polarizing components, and the detector may be further configured as described herein. In one such example, the side channel may be configured to collect and detect light that is scattered out of the plane of incidence (e.g., the side channel may include a lens, which is centered in a plane that is substantially perpendicular to the plane of incidence, and a detector configured to detect light collected by the lens).

Computer subsystem 404 may be configured to acquire the output generated by the optical subsystem. For example, image(s) generated by the detectors during scanning may be provided to computer subsystem 404. In one such example, the computer subsystem may be coupled to each of the detectors (e.g., by one or more transmission media shown by the dashed lines in FIG. 4, which may include any suitable transmission media known in the art) such that the computer subsystem may receive the image(s) generated by the detectors. The computer subsystem may be coupled to each of the detectors in any suitable manner.

The computer subsystem may be configured to perform one or more functions using the output generated by the detectors. For instance, the computer subsystem may be configured to detect the defects on the wafer using the output generated by the detectors. In one such example, the computer subsystem may be configured to apply one or more defect detection algorithms and/or methods to the output of one or more of the detectors, and the algorithms and/or methods may include any suitable algorithms and/or methods known in the art. In addition, the computer subsystem is shown in FIG. 4 as being a part of an overall wafer inspection system. However, the computer systems described herein may not be part of a wafer inspection system and may possibly be coupled to a computer subsystem such as that shown in FIG. 4 via one or more transmission media or by a shared storage medium such as a fab database. In this manner, the computer system of the system may be a stand alone computer system that is not actually part of a wafer inspection system.

It is noted that FIG. 4 is provided herein to generally illustrate one configuration of an optical subsystem that may be included in the system embodiments described herein. Obviously, the optical subsystem configuration described herein may be altered to optimize the performance of the optical subsystem as is normally performed when designing a commercial inspection system. In addition, the systems described herein may be implemented using an existing inspection system (e.g., by adding functionality described herein to an existing inspection system) such as the Puma 90xx, 91xx, and 93xx series of tools that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system.

In additional embodiments, the optical subsystem and/or the computer subsystem(s) described herein may be replaced with one or more virtual inspection systems such as those described in commonly assigned U.S. Pat. No. 8,126,255 issued on Feb. 28, 2012 to Bhaskar et al. and commonly assigned U.S. patent application Ser. No. 14/184,417 filed on Feb. 19, 2014 by Duffy et al., both of which are incorporated by reference as if fully set forth herein. Such methods and systems may be configured to perform any of the step(s) described herein.

Further modifications and alternative embodiments of various aspects of the invention will be apparent to those skilled in the art in view of this description. For example, methods and systems for setting up a classifier for defects detected on a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for setting up a classifier for defects detected on a wafer, comprising:
    generating a template for a defect classifier for defects detected on a wafer;
    applying the template to a training data set, wherein the training data set comprises information for defects detected on the wafer or another wafer, wherein applying the template to the training data set automatically creates an initial version of the defect classifier, and wherein the training data set does not comprise classifications for defects in the training data set; and
    determining one or more parameters for the defect classifier based on results of said applying, wherein determining the one or more parameters comprises tuning one or more parameters of the initial version of the defect classifier to determine the one or more parameters for the defect classifier, and wherein the generating, applying, and determining steps are performed with a computer system.

2. The method of claim 1, wherein the template is a level-based template, and wherein the defect classifier is a level-based defect classifier.

3. The method of claim 1, wherein applying the template comprises separating the defects in the training data set into stable populations.

4. The method of claim 1, wherein tuning the one or more parameters of the initial version of the defect classifier comprises sampling one or more defects from different nodes in the initial version of the defect classifier resulting from the applying step and determining a classification of the one or more sampled defects.

5. The method of claim 1, wherein the template comprises information for one or more nodes of the defect classifier.

6. The method of claim 1, wherein generating the template comprises receiving parameters for the template from a user via a user interface provided by the computer system.

7. The method of claim 1, wherein the template comprises information about user input to be received during one or more steps of the method.

8. The method of claim 1, wherein the applying and determining steps are performed by executing one or more algorithms from nodes of the initial version of the defect classifier.

9. The method of claim 1, further comprising displaying results of said applying in a user interface and receiving a user selection of one or more nodes in the results for analysis via the user interface, wherein the determining step further comprises executing one or more algorithms from the one or more selected nodes to analyze the one or more selected nodes.

10. The method of claim 9, wherein said determining further comprises displaying results of executing the one or more algorithms to the user via the user interface and allowing the user to select at least some of the one or more parameters for the defect classifier.

11. The method of claim 1, wherein said determining further comprises interrupting the determining to request input from a user for a node of an intermediate version of the defect classifier and upon receipt of the input from the user, resuming the determining step for other nodes in the defect classifier.

12. The method of claim 11, wherein the input is requested from the user by displaying a sorted list of suggestions for the node from which the user can select the one or more parameters for the node.

13. The method of claim 1, wherein the applying and determining steps further comprise searching all values of all attributes of the defects in the training set data for one or more best segmentation candidates for one or more nodes of the defect classifier.

14. The method of claim 1, further comprising determining different defect classifiers for different wafer inspection recipes using the template.

15. The method of claim 1, wherein the applying and determining steps produce detect classification results for the training data set, and wherein the method further comprises determining information for a wafer inspection recipe for the wafer, the other wafer, or an additional wafer based on the defect classification results.

16. The method of claim 15, wherein the information for the wafer inspection recipe comprises a determination of whether the wafer inspection recipe is valid.

17. The method of claim 15, wherein the information for the wafer inspection recipe comprises information for one or more differences between the wafer inspection recipe and another wafer inspection recipe.

18. The method of claim 15, wherein the information for the wafer inspection recipe comprises information for whether one or more nuisance filters in the wafer inspection recipe adhere to the template.

19. The method of claim 1, wherein the generating, applying, and determining steps are performed automatically by the computer system.

20. The method of claim 1, wherein at least one of the generating, applying, and determining steps are performed manually by a user of the computer system.

21. A non-transitory computer-readable medium, storing program instructions executable on a computer system for performing a computer-implemented method for setting up a classifier for defects detected on a wafer, wherein the computer-implemented method comprises:
generating a template for a defect classifier for defects detected on a wafer;
applying the template to a training data set, wherein the training data set comprises information for defects detected on the wafer or another wafer, wherein applying the template to the training data set automatically creates an initial version of the defect classifier, and wherein the training data set does not comprise classifications for defects in the training data set; and
determining one or more parameters for the defect classifier based on results of said applying, wherein determining the one or more parameters comprises tuning one or more parameters of the initial version of the defect classifier to determine the one or more parameters for the defect classifier.

22. A system configured to set up a classifier for defects detected on a wafer, comprising a computer system configured for:
generating a template for a defect classifier for defects detected on a wafer;
applying the template to a training data set, wherein the training data set comprises information for defects detected on the wafer or another wafer, wherein applying the template to the training data set automatically creates an initial version of the defect classifier, and wherein the training data set does not comprise classifications for defects in the training data set; and
determining one or more parameters for the defect classifier based on results of said applying, wherein determining the one or more parameters comprises tuning one or more parameters of the initial version of the defect classifier to determine the one or more parameters for the defect classifier.

23. The system of claim 22, wherein the template is a level-based template, and wherein the detect classifier is a level-based defect classifier.

24. The system of claim 22, wherein applying the template comprises separating the defects in the training data set into stable populations.

25. The system of claim 22, wherein tuning the one or more parameters of the initial version of the defect classifier comprises sampling one or more defects from different nodes in the initial version of the defect classifier resulting from the applying step and determining a classification of the one or more sampled defects.

26. The system of claim 22, wherein the template comprises information for one or more nodes of the defect classifier.

27. The system of claim 22, wherein generating the template comprises receiving parameters for the template from a user via a user interface provided by the computer system.

28. The system of claim 22, wherein the template comprises information about user input to be received during one or more steps performed by the computer system.

29. The system of claim 22, wherein the applying and determining steps are performed by executing one or more algorithms from nodes of the initial version of the defect classifier.

30. The system of claim 22, wherein the computer system is further configured for displaying results of said applying in a user interface and receiving a user selection of one or more nodes in the results for analysis via the user interface, and wherein the determining step further comprises executing one or more algorithms from the one or more selected nodes to analyze the one or more selected nodes.

31. The system of claim 30, wherein said determining further comprises displaying results of executing the one or more algorithms to the user via the user interface and allowing the user to select at least some of the one or more parameters for the defect classifier.

32. The system of claim 22, wherein said determining further comprises interrupting the determining to request input from a user for a node of an intermediate version of the defect classifier and upon receipt of the input from the user, resuming the determining step for other nodes in the defect classifier.

33. The system of claim 32, wherein the input is requested from the user by displaying a sorted list of suggestions for the node from which the user can select the one or more parameters for the node.

34. The system of claim 22, wherein the applying and determining steps further comprise searching all values of all attributes of the defects in the training set data for one or more best segmentation candidates for one or more nodes of the defect classifier.

35. The system of claim 22, wherein the computer system is further configured for determining different defect classifiers for different wafer inspection recipes using the template.

36. The system of claim 22, wherein the applying and determining steps produce defect classification results for the training data set, and wherein the computer system is further configured for determining information for a wafer inspection recipe for the wafer, the other wafer, or an additional wafer based on the defect classification results.

37. The system of claim 36, wherein the information for the wafer inspection recipe comprises a determination of whether the wafer inspection recipe is valid.

38. The system of claim 36, wherein the information for the wafer inspection recipe comprises information for one or more differences between the wafer inspection recipe and another wafer inspection recipe.

39. The system of claim 36, wherein the information for the wafer inspection recipe comprises information for whether one or more nuisance filters in the wafer inspection recipe adhere to the template.

40. The system of claim 22, wherein the generating, applying, and determining steps are performed automatically by the computer system.

41. The system of claim 22, wherein at least one of the generating, applying, and determining steps are performed manually by a user of the computer system.

* * * * *